// United States Patent [15] 3,653,003
Hemdal [45] Mar. 28, 1972

[54] APPARATUS FOR IDENTIFYING THOSE MEANS OF A PLURALITY OF MEANS WHICH HAVE CHANGED STATE

[72] Inventor: Goran Anders Henrik Hemdal, Bollmoravagen, Sweden

[73] Assignee: Telefonaktiebolaget LM Ericsson, Stockholm, Sweden

[22] Filed: May 1, 1970

[21] Appl. No.: 33,642

[30] Foreign Application Priority Data

May 29, 1969 Sweden..................................7573/69

[52] U.S. Cl..........................340/173 R, 179/7 R, 340/172.5, 340/173 AM

[51] Int. Cl........................................G11c 15/00, G11c 9/00

[58] Field of Search....................340/173 R, 173 AM, 172.5; 179/7 R

[56] References Cited

UNITED STATES PATENTS

| | | | |
|---|---|---|---|
| 3,493,939 | 2/1970 | Dunn | 340/173 AM |
| 3,508,220 | 4/1970 | Stampler | 340/173 AM |
| 3,560,941 | 2/1971 | Wallace, Jr. | 340/173 R |

*Primary Examiner*—Bernard Konick
*Assistant Examiner*—Stuart Hecker
*Attorney*—Hane, Baxley & Spiecens

[57] ABSTRACT

Apparatus for identifying those means of a plurality of means which have changed their binary state. A reference is sequentially obtained to only those means which have changed their state without spending unnecessary work sifting off the remaining means. The arrangement is particularly applicable in telecommunication systems, more especially such systems which have a central control, e.g., program store controlled systems in which the arrangement makes it possible to reduce considerably the idle load of a controlling computer.

8 Claims, 7 Drawing Figures

INVENTOR

GÖRAN ANDERS HENRIK HEMDAL

BY Hane, Baxley & Spiecens

ATTORNEYS

INVENTORS
GÖRAN ANDERS HENRIK HEMDAL
BY Hane, Barlay and Spiecens
ATTORNEYS

INVENTOR

Göran Anders Henrik Hemdal

BY Hane, Baxley and Spiecens

ATTORNEYS

INVENTOR

GÖRAN ANDERS HENRIK HEMDAL

BY Hane, Baxley and Spiecens

ATTORNEYS

INVENTOR
GÖRAN ANDERS HENRIK HEMDAL

BY Hane, Baxley and Spiecens
ATTORNEYS

APPARATUS FOR IDENTIFYING THOSE MEANS OF A PLURALITY OF MEANS WHICH HAVE CHANGED STATE

The present invention relates to an arrangement for identifying from among a great number of means such means which have changed their state. The arrangement concerns especially telecommunication systems, more particularly such systems which have a central control, for example, program store controlled systems.

It is previously known to identify in program store controlled telecommunication installations such means, for example connecting means which have changed their binary state by means of a scanning according to a certain predetermined sequence. If the controlling computer during its scanning finds that a change of state has occurred in some means, it can then perform the tasks necessary for the means in question. Upon each scanning there is however only a small number of means in which a change of state has occurred, and for this reason the method implies that most of the means must be scanned unnecessarily. This in its turn results in a great idle load for the data processing system. It is true that this idle load can be reduced by introducing special instructions but for exchanges with difficult time demands, i.e., such exchanges which require scanning intervals of the order of 5–10 milliseconds, the idle load can in spite of that exceed 50 percent.

It is also known to produce a certain decrease of this idle load by arranging the means comprised in the installation into groups and by allowing the scanning to take place in groups in such a way that as long as no change of state has occurred in any means within the group subjected to scanning at a certain moment, the scanning will continue with the next group, and only if a change has occurred within the group will there be a scanning of the devices of the group in question. By means of this method described for example in the Swedish patent 307,387 it is possible to reduce the idle load to a considerably lower level but even this result must in certain cases be considered insufficient.

An object of the invention is to provide an arrangement by means of which it is possible to reduce considerably the idle load of the controlling computer in a program store controlled telecommunication system by identifying such means in the installation which have changed their state from non-activated condition into activated condition and vice versa. The arrangement is characterized as is indicated in the characterizing part of the main claim.

Figure 1:
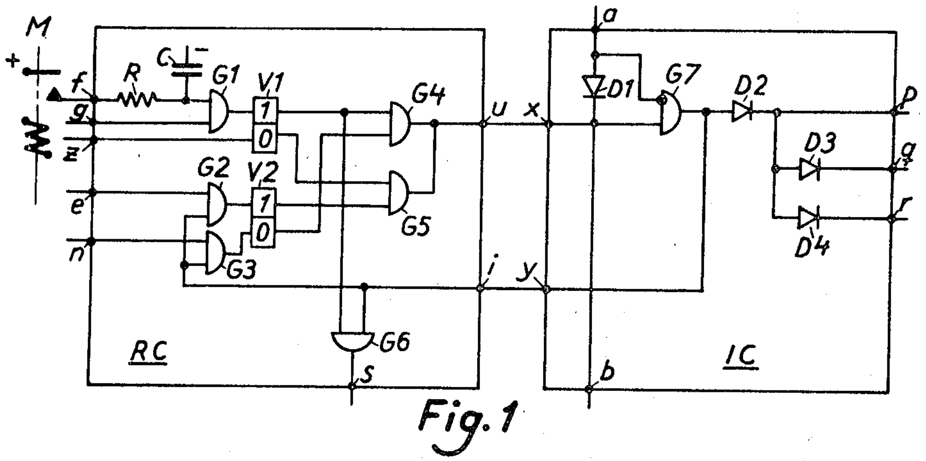
Figure 2:
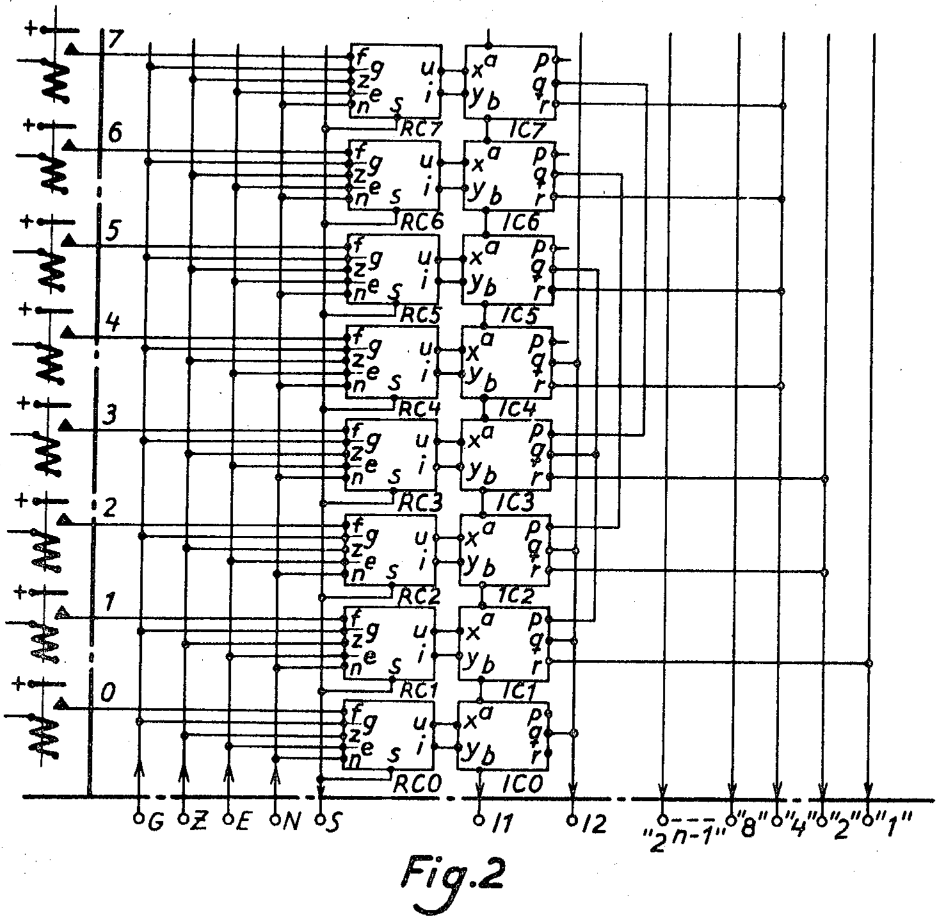
Figure 3:
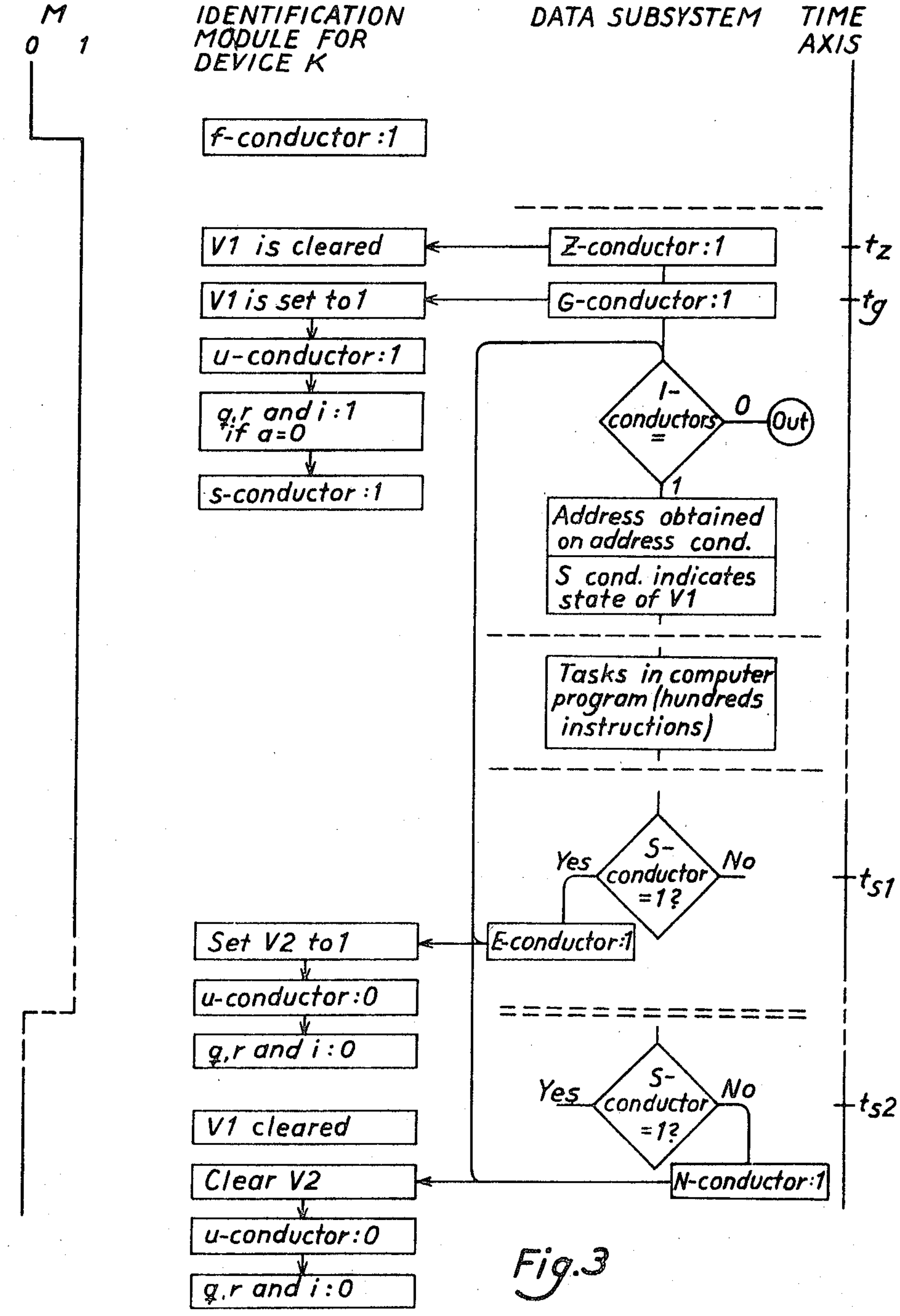
Figure 4:
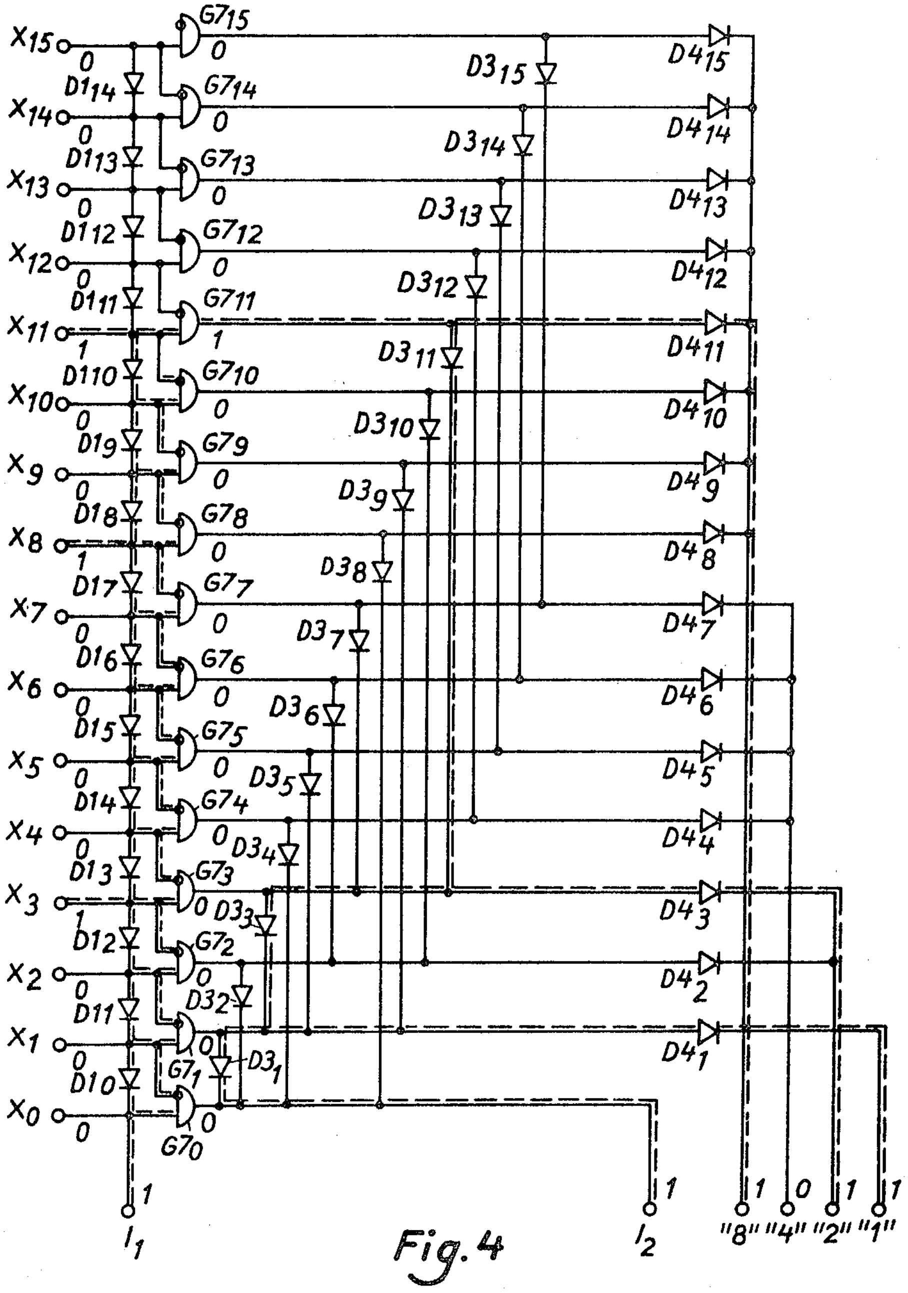
Figure 5:
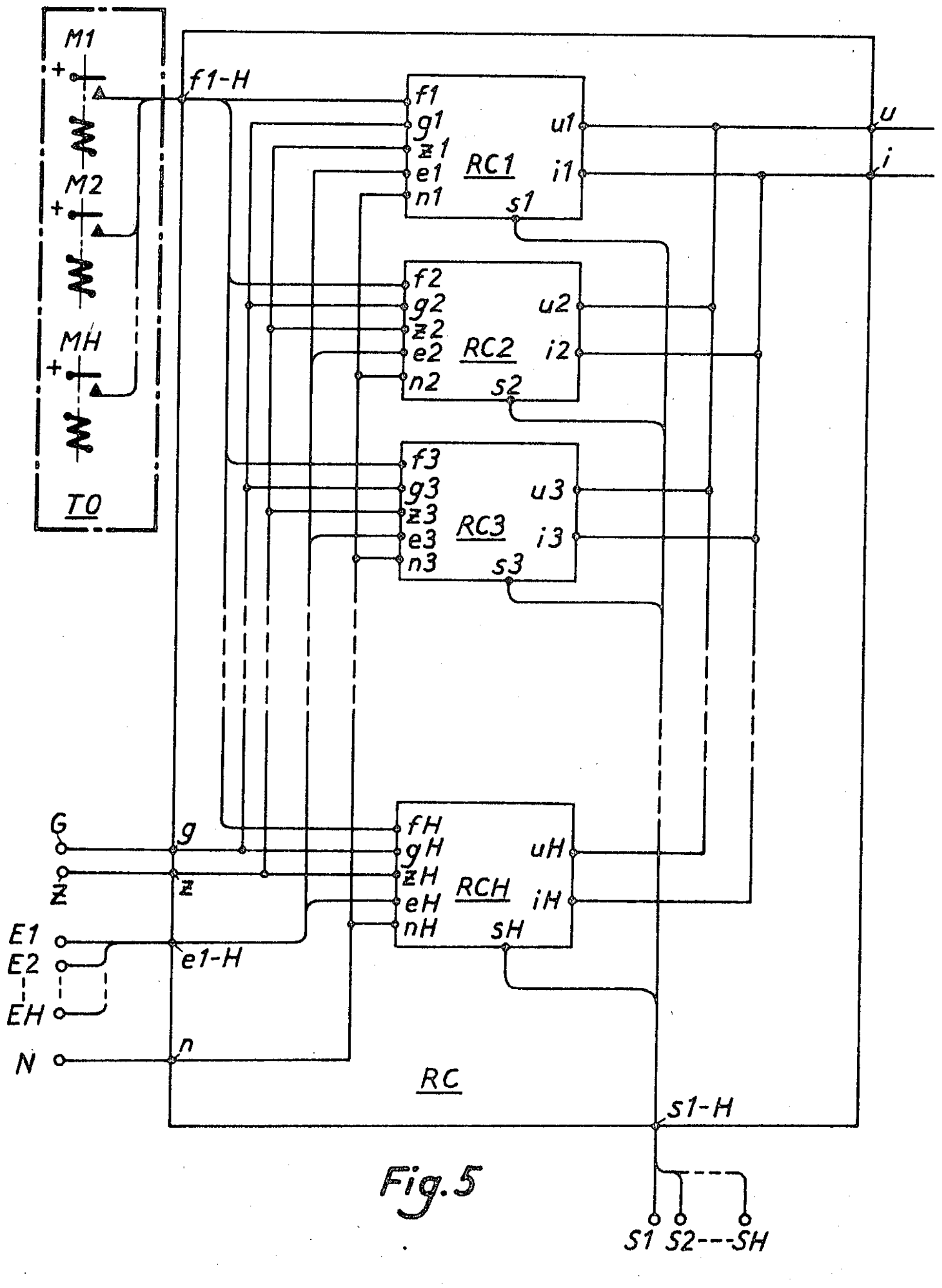
Figure 6:
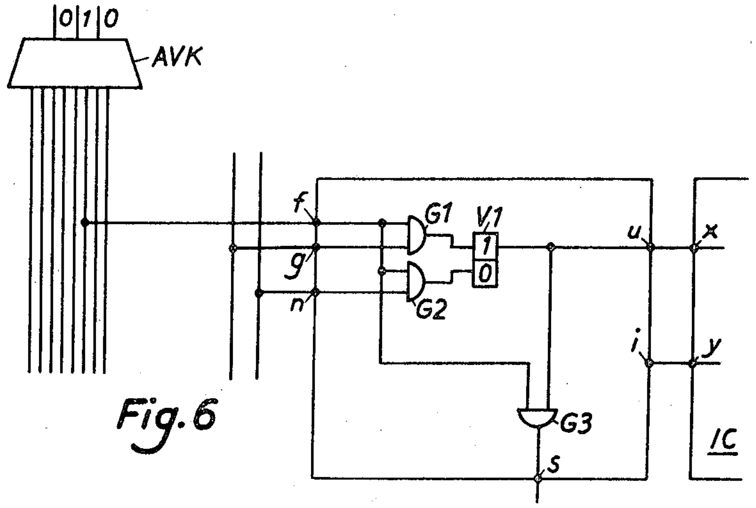
Figure 7:
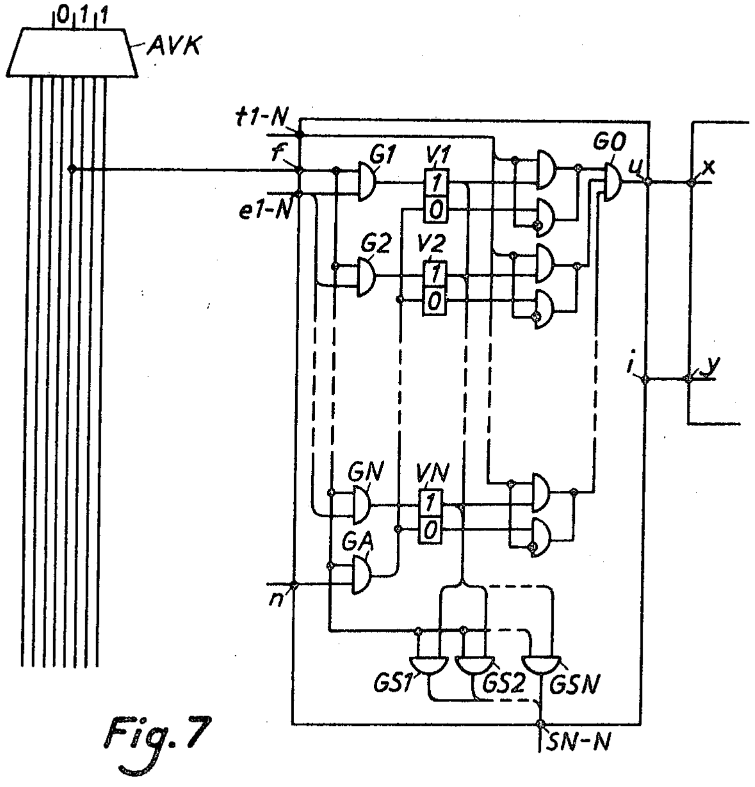

The invention will be described more in detail below by means of an embodiment with reference to the enclosed drawing in which FIG. 1 is a circuit diagram of a unit in an identifier according to the invention, FIG. 2 is a circuit diagram of a part of an identifier built up of circuits according to FIG. 1, FIG. 3 is a flow diagram of the process for identification by means of the arrangement according to FIGS. 1 and 2, FIG. 4 shows the principle for the identification in detail, FIG. 5 shows another example of the structure of an identifier, FIG. 6 is a circuit diagram of a part of a unit in an identifier intended for use with internal signals, and FIG. 7 is a circuit diagram of a part of a unit in an identifier intended for delayed identification of internal signals.

FIG. 1 is a circuit diagram of one unit among a number of units comprised in a signal identifier according to the invention, each of said units belonging to a means which is to be identified. The unit comprises on the one hand a receiving or memory circuit RC, and on the other hand an identification circuit IC. The memory circuit consists of two bistable circuits V1 and V2, six AND-gates G1...G6 and an RC circuit. The identification circuit consists of an AND gate with inversion on the one input G7 and four diodes D1...D4. Both circuits have a number of inputs and outputs, the function of which appears from the following description.

FIG. 2 shows an example of a signal identifier according to the invention constructed of a number of units according to FIG. 1. Eight of said units are shown. The inlets *g*, *z*, *e*, and *n* are interconnected to common conductors G, Z, E, and N which form outlets from the controlling computer of the telecommunication system while the inlets *f* are individual and lead separately to a make contact of their respective relay operated by the pertaining means which is to be identified. The outlets *s* are interconnected to a common conductor S constituting one of the inlets to the computer. Each output *b* from an identification circuit is connected to the input *a* of the following identification circuit, except the last *b* output which forms an indicator conductor I1 being an inlet to the computer. The outputs *q* and *r* from the identification circuits are in dependence on the position of the modules connected to a number of address conductors designated by $2^{n-1}$...8, 4, 2, and 1. The *q* outlets from the modules with numbers 0, 1, 2, 4, and so on are connected to another indicator conductor I2. The connections designated by *p* can be used as inlets or outlets as will be described below.

In the rest position, the bistable circuits V1 and V2 (FIG. 1) are cleared and the relay M is in non-activated condition. It is now assumed that a signal is received by a means K which implies that the indicating relay M of the means is operated, the capacitor C beginning to be charged up. After a certain time, dependent on the time constant of the circuit RC, the voltage of the one input of the gate G1 has reached such a value that the input is in its 1 condition. This delay filters out false signals in the form of disturbances. On the Z-conductor a pulse is sent out periodically from the computer (not shown). Then a pulse is sent on the G-conductor from the computer which sets the bistable circuit V1 to 1. Thus a signal indicating the condition of the means has been stored in V1. The process has been shown in the flow diagram, FIG. 3.

It is assumed that the relay M had operated before the Z-conductor was activated at the moment $t_Z$. As the bistable circuit V1 now is in its 1 condition and V2 in its 0 condition, the gate circuit G4 is opened and activates the output *u* from the circuit RC as well as the input *i* of the circuit IC. In case the *a* input of the IC circuit is in 1 condition, the gate G7 is blocked, so that the outputs *y*, *q*, and *r* are in 0 condition. If on the contrary the *a* input is in its 0 condition, the gate G7 is opened and the outputs *y*, *q*, and *r* are activated. Because the *i* input of the circuit RC is in 1 condition when the gate G7 is blocked, the *s* output is activated by the gate circuit G6 resulting in the fact that after a certain time the computer is to send a signal to one of the inputs of the circuit RC, as will be explained below. The activation of the output *u* and therewith the input *x* of the identification circuit has caused an activation of the output *b*, consequently all identification circuits with lower sequence numbers are blocked. Furthermore the indicator conductor I1 is activated. Via the outputs *q* and *r* certain of the address conductors are activated in such a way that they indicate the sequence numbers, corresponding to the actual unit. Thus, if only unit number 7 is concerned, the address conductors 4, 2, and 1 are activated as will be explained in connection with the FIGS. 2 and 4. The address conductors indicates the binary number 111. Simultaneously the indicator conductor I2 is activated. The further indicator conductor is to provide a redundancy as will be described below.

By the activation of the indicator conductors the computer will know that a signal has been received. By the S-conductor the computer receives information on the condition of the bistable circuit V1 in the unit, the sequence number of which is indicated by the address conductors. The S-conductor was in this case in its 1 condition. This has the effect that the computer sends out a pulse on the E-conductor. Consequently, the bistable circuit V2 of the unit corresponding to the means K is set to 1 because this is the only unit having its *i* input activated and therewith the second input of the gate circuit G2 is activated. The 1 setting of bistable circuit V2 implies that the activation of the *u* conductor is nullified and all the outputs of the unit are now in the 0 condition. The process just described concerning the unit belonging to the means K is then repeated for the means following next in sequence which has received a signal. This process will be repeated until all means having received signals have been identified.

It is now assumed that a previously received signal to a certain means Q, ceases. When this happens both bistable circuits V1 and V2 are in their 1 condition. Upon activation of the Z-conductor, bistable circuit V1 is cleared, in consequence of which the gate circuit G5 is opened and, also, in this case, the $u$ output will be activated. The remaining process is identical with that described above, only with the difference that the $s$ conductor now cannot obtain the 1 condition but remains in its 0 condition. Therefore, the computer receives information that the signal has ceased for the means indicated by the address conductors. In this case the N-conductor is activated in order to nullify the 1 condition of the $u$ conductor by clearing the bistable circuit V2.

Thus identification of all means is carried out, both such means which have received a control signal and such means for which a previously received control signal terminates.

FIG. 4 shows the principle for the identification in detail. Only those circuits which are essential for the identification have been shown, and, consequently, the circuits RC have been omitted. The index corresponds to the sequence numbers of the units and the designations are otherwise the same as those used in the FIGS. 1 and 2. It is now assumed that a change of state has occurred in the means with sequence numbers 11, 8, and 3, i.e., the $x$ conductors $x_{11}$, $x_8$, and $x_3$ are in 1 condition while all other $x$ conductors are in their 0 condition. The "1" on conductor $x_{11}$ blocks by means of the diodes $D1_{10}...D1_0$ all G7 gates from $G7_{10}$ and downwards as is indicated by the dotted lines through the respective diodes $D1_{10}...D1_0$ of the gate circuits $G7_{10}...G7_0$. Only the gate $G7_{11}$ has the output signal "1." This "1" results on the one hand in the activation of the address conductor "8" as has been indicated by a dotted line above the diode $D4_{11}$, i.e., via the $r$ conductor (FIGS. 1 and 2) in the unit IC11, and on the other hand that the address conductor "2" is activated via the diodes $D3_{11}$ and $D4_3$, i.e., via the $q$ conductor of the unit IC11, the $p$ conductor and the $r$conductor in the unit IC3, and furthermore that the address conductor "1" is activated via the diodes $D3_3$ and $D4_1$ , i.e., via the $q$ conductor of IC 3 and the $p$ conductor and the $r$ conductor of IC1. Also the indicator conductor I2 is activated via the diode $D3_1$, i.e., via the $q$ conductor of IC1. The indicator conductor I1 is activated by the "1" on $x_{11}$ via the diodes $D1_{10}...D1_0$. Via the address conductors the binary combination 1011 is obtained, i.e., decimally 11.

Upon comparison with the FIGS. 1 and 2 it appears that only the $i$ conductor in the unit RC11 is in "1" condition, i.e., the S-conductor indicates the condition of the bistable circuit $V1_{11}$. A possible activation of the E- or the N-conductors will thus influence only the unit RC11. By reading of the value of bistable circuit $V1_{11}$ with the help of the S-conductor and by the following 1 setting of $V2_{11}$ with the help of the E-conductor and by clearing of the same by means of the N-conductor, respectively, the "1" is inhibited, whereby the identifier will select means with the sequence number 8 in a similar way as has been described above for means number 11. Then the process of the means with sequence number 3 is repeated, and after that the zero condition will exist in the indicator conductors I1 and I2 indicating that no more changes of state are to be identified.

FIG. 5 shows an example of how different relays indicating the changes of state of different parts of a means, can be identified. The receiving part consists in this case of H simple RC modules according to FIG. 1 connected in parallel with respect to the $g$, $z$, $n$, $u$, and $i$ conductors while the $f$ conductors are connected individually in the same way as has been shown in FIG. 2, and the E- and S-conductors are multiplied H times. The conductors S1...SH indicate in this case the relay conditions of the relays M1...MH which in a similar way as in the preceding example results in a pulse transmission on the corresponding E-conductors for activation of the bistable circuits V2, so that the 1 signal on the $x$ input of the corresponding identification circuit is inhibited.

The examples considered up to now concern the change of state of means which is indicated by means of relays. The arrangement can however with a certain modification be used also for the identification of means selected from the computer as is explained in connection with FIG. 6. The addressing from the computer to a certain unit is carried out by means of an address decoder AVK. By sending for example the binary code 010 to this, the $f$ conductor in the RC unit with sequence number 2 will be activated. By activating simultaneously the common $g$ conductor, the bistable circuit V1 of said unit is set to 1, which accordingly has received the internal selecting signal. The inhibiting of the signal on the output u occurs by activating the common $n$ conductor, which implies clearing of the bistable circuit V1.

The actual identifying occurs as in the arrangements according to FIGS. 1–5 in such a way that the controlling computer periodically scans the indicator conductors I1 and I2 (compare FIG. 2) if some means has been selected, and if so is the case, the address to this is obtained by means of the address conductors as has been described earlier. When all measures for the means in question have been performed, the signal is inhibited by addressing of the respective RC unit and activation of the common $n$ conductor, as has been described above. The indicator conductors indicate if there are further selected means to identify.

The above described identification method presupposes that the means is identified at the first possible opportunity, i.e., at the next following periodic scanning. Cases may however occur when it is desirable to delay the identifying, so that it takes place only in a certain predetermined time interval. In order to achieve this a receiving circuit can be designed in conformity with FIG. 7. In contrast to the preceding figure a receiving circuit comprises a number of bistable circuits V1...VN instead of only one. These can in an analogous manner as the only bistable circuit of FIG. 6 be switched so that the $f$-conductor of the actual unit is activated via the address decoder AVK and after that within the unit all bistable circuits are cleared by activating the $n$ conductor, and then the intended value is set by means of activation of the mentioned $e$ conductors $e1...eN$.

During the periodic scanning a number of reference conductors $t1...t_N$ corresponding to the number of N bistable circuits is used, a reference conductor for each bistable circuit. The principle for the identification is that the $u$ conductor of a certain means is activated only if the bistable circuit V1 has the same value as the reference conductor $t1$, if bistable circuit V2 has the same value as conductor $t2$ etc. By letting the reference conductors obtain their value from a clock circuit which is stepped one step for each periodic scanning, an identification of the actual means in a desired interval can be initiated. This is done in such a way that the actual value of the clock circuit is first read, then the number of intervals to be delayed is added to this value and thereafter the actual means is addressed and the bistable circuits set to the value so obtained. After the indicated number of intervals the clock circuit has assumed this value and thus identification is obtained at the fixed moment by activating all the inputs of the gate circuit G0. By addressing a unit according to the above description the actual value of the position of the bistable circuits on the outputs S1...SN is obtained by means of the AND-gates GS1...GSN.

By means of circuits described above the routine dependent load of the computer can be reduced to less than 10 percent, i.e., 90 percent of the capacity of the computer can be made use of for useful work.

In the examples described above the identification of means has been described in connection with program store controlled telephone systems. However, it is obvious that the invention is applicable in other cases where one means among a great number of means is to be identified.

I claim:

1. Apparatus for identifying in a plurality of conductors capable of having either one of two states those conductors that are in said plurality which have changed state subsequent to a previous identification, said apparatus comprising: a plurality of memory circuits, each of said memory circuits being associated with a different conductor for generating at an output either a 1 signal or a 0 signal in accordance with the state of the associated conductor, each of said memory circuits including switching means responsive to a control signal for terminating a 1 signal at the memory circuit output; a plurality of identification circuits each associated with a different one of said conductors for generating as identity number assigned to the associated conductor as a coded combination of signals, each of said identification circuits having a cascade input terminal, a cascade output terminal and a diode interconnecting said terminals; means for connecting the cascade output terminal of one identification circuit to the cascade input terminal of another identification circuit whereby said identification circuits are connected in cascade via said diodes, each of said identification circuits including a two-input logic circuit for generating one of said coded combination signals when activated, one of the inputs of said logic circuit being connected to the cascade input terminal of its identification circuit, the other of the inputs of said logic circuit being connected to its cascade output terminal of its identification circuit and to the output of its associated memory circuit, said logic circuit being activated only when said one input receives a 0 signal and said other input receives a 1 signal whereby only one of the logic circuits can be activated at one time and said logic circuit when activated including means for transmitting a control signal to the switching means of its associated memory circuit whereby the output of said memory circuit transmits a 0 signal via the cascade output terminal of its identification circuit to the cascade input terminal of all following identification circuits up to an identification circuit whose associated memory circuit transmits a 1 signal.

2. The arrangement of claim 1 and further comprising an indicator circuit connected to one end of the cascaded series of diodes to generate a 1 signal as long as a 1 signal is applied to any cascade input terminal.

3. The apparatus of claim 1 wherein each of said memory circuits includes a pulse counting resistor delay means operable to delay the activation of the memory circuit for a period of time after a particular change of state of the associated conductor.

4. Apparatus according to claim 1 wherein the state of a conductor is dependent on the state of a two-state device connected thereto.

5. Apparatus according to claim 4 wherein each memory circuit comprises a first bistable circuit having an output connected to the output of the memory circuit and an input, a two-input logic circuit having an output connected to the input of said first bistable circuit, the first input of said logic circuit being connected to the associated conductor, and means for applying a further control signal to the other input of said logic circuit.

6. Apparatus according to claim 5 wherein a resistor-capacitor circuit connects said first input to said associated conductor so that only signals having a predetermined duration can activate said logic circuit.

7. The apparatus according to claim 5 wherein said switching means in each memory circuit comprises a second bistable circuit which is activated by said control signal from the associated identification circuit, a further logic circuit connected to said first and second bistable circuits for controlling the transmission of a 1 signal or a 0 signal from the output of the associated memory circuit in accordance with predetermined states of said bistable circuits, an indicating means associated with each memory circuit and the identification circuit associated therewith and connected to the first bistable circuit of said memory circuit and to the logic circuit of said identification circuit for giving an indication when said identification circuit is activated and the conductor associated therewith changes state.

8. The apparatus of claim 7 wherein each of said first bistable circuits includes a self-cleaning means responsive to a clear signal, each of said second bistable circuits includes a conditional activating means connected to receive the control signal from the associated identification circuit, and a computer having a first clear signal output connected to all of said self-cleaning means, an activating signal output connected to each of said conditional activating means, said computer further having a plurality of signal inputs for receiving the coded combinations of signals representing identity numbers from all of said identification circuits.

* * * * *